A. DANIELSSON.
PARTED CAGE FOR BALL OR ROLLER BEARINGS.
APPLICATION FILED JULY 1, 1919.
1,366,312. Patented Jan. 18, 1921.
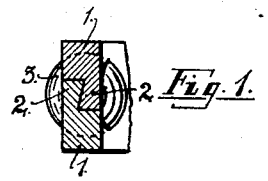
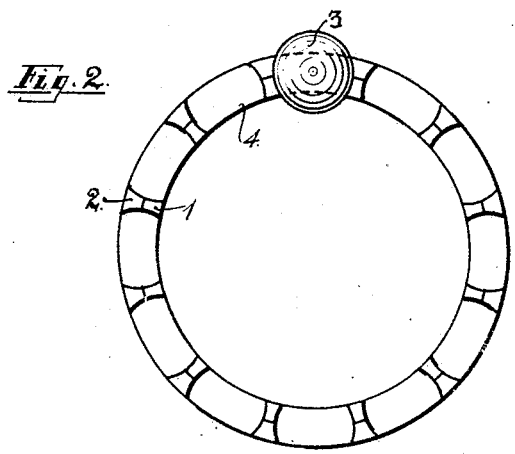
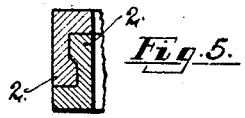
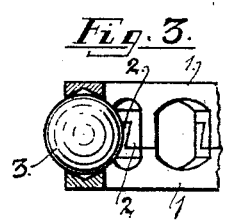
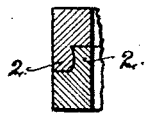
Inventor:
A. Danielsson,
By H R Kerslake
Attorney

UNITED STATES PATENT OFFICE.

AXEL DANIELSSON, OF GOTTENBORG, SWEDEN, ASSIGNOR TO NORDISKA KULLAGER AKTIEBOLAGET, OF GOTTENBORG, SWEDEN.

PARTED CAGE FOR BALL OR ROLLER BEARINGS.

1,366,312. Specification of Letters Patent. Patented Jan. 18, 1921.

Application filed July 1, 1919. Serial No. 307,906.

*To all whom it may concern:*

Be it known that I, AXEL DANIELSSON, a subject of the King of Sweden, residing at Gottenborg, in the county of Gottenborg and Bohus and Kingdom of Sweden, have invented new and useful Improvements in Parted Cages for Ball or Roller Bearings, of which the following is a specification.

This invention refers to cages for ball- or roller bearings and has for its object to provide a cage suited to be used in radial as well as in axial ball- or roller bearings, which will be easy in mounting or dismounting and cheap to manufacture. More especially this invention refers to cages composed of coacting rings to facilitate the inserting or removing of the balls or the rollers.

In the previously used cages for ball- or roller bearings wherein the cage is composed of two rings for lateral application on the shaft, these rings have generally been held together with keys or rivets or by pins in one of the rings pressed into grooves in the body of the other ring. My improvement avoids such pins, etc., as the rings form a complete cage by being pressed against each other thereby making special means for holding the rings assembled superfluous.

My improvement chiefly consists of two laterally disposed interlocking rings so arranged that the rings when assembled to form the complete cage may be pressed together on account of the resiliency of the metal without exceeding their elastic limit. Said hooks, etc., may be of various forms, but they must be designed so that they are not subjected to any considerable strain after being completed.

In the accompanying drawing forming a part of this specification some embodiments of the improved cage are illustrated, in which drawings—

Figure 1 represents a view of a cage for radial-bearings in section between two balls, Fig. 2 shows the one ring of the cage viewed from its inner side and with one ball in position, Fig. 3 is a cross-sectional view of the cage along the center line of a ball, Figs. 4 and 5 are sectional views of the cage showing various embodiments of the hooks or fastening means.

Referring now, more particularly to the drawings, there is provided a cage composed of two laterally disposed interlocking ball or roller receiving rings 1 of resilient metal. The adjacent edges of the rings are cut-away circumferentially to provide engaging surfaces 2 substantially in the form of hooks or laps for interlocking engagement, owing to the resiliency of the metal, at the time the rings are brought together laterally.

When the cage is to be assembled the balls (or rollers) first are mounted into the one of the rings 1 and then the other ring placed upon the first mentioned ring and forced down, whereby the engaging surfaces or hooks 2 will be pressed against and slide over each other, on account of the tension in the metal. This tension however must not be so great, that the elastic limit of the metal will be exceeded, and the hooks 2 therefore must be formed accordingly. The sliding surfaces of the hooks may be formed from a cone, a sphere, a cylinder or may be flat or of any other usual form and the touching line in the cross section of the rings may have one or more teeth. The embodiments, shown in the drawings refer to a radial bearing, the improvement, however, may be applied on axial bearings as well.

The advantage of the present improved cage is not only that the cage may be easily mounted, but that a considerable number of balls or rolls can go into the cage and that its manufacturing is very simple.

The rings are constructed of metal which is not resilient in its original form and they are constructed in the desired shape by boring, casting, etc., being thus rendered slightly resilient for the purposes stated and it is intended that this feature be embraced in the term "solid" in the claim.

Having thus described my invention what I claim as new and want to secure by Letters Patent is:—

An antifriction bearing cage comprising a pair of solid metal rings possessing resiliency and designed for embracing antifriction bodies provided with projections facing each other and projecting into the interspace between the antifriction bodies, the sides of the projections constituting hooks for coöperating with each other, the said hooks being arranged in such manner so that when assembled to form a cage the hooks of one ring project past the hooks of the other ring, and the engaging surfaces of the hooks having such a shape that during the assembling operation the rings are forced together owing to the resiliency of the metal without exceeding the limit of the elasticity thereof, whereby to effect a locking engagement between corresponding hooks.

In testimony whereof I have affixed my signature.

AXEL DANIELSSON.